March 11, 1930.  G. A. SCHETTLER  1,749,891
SPLITTING MACHINE
Filed March 4, 1927   3 Sheets-Sheet 1

INVENTOR
Gustav Adolf Schettler
By his Attorney,
Nelson W. Howard

March 11, 1930.                 G. A. SCHETTLER                 1,749,891
                                SPLITTING MACHINE
                             Filed March 4, 1927           3 Sheets-Sheet 3

INVENTOR
Gustav Adolf Schettler
By his Attorney,

Patented Mar. 11, 1930

1,749,891

UNITED STATES PATENT OFFICE

GUSTAV ADOLF SCHETTLER, OF LEEDS, ENGLAND, ASSIGNOR TO THE TURNER TANNING MACHINERY COMPANY, OF PORTLAND, MAINE, A CORPORATION OF MAINE

SPLITTING MACHINE

Application filed March 4, 1927, Serial No. 172,754, and in Great Britain March 26, 1926.

This invention relates to cutting machines and is illustrated as embodied in a machine for splitting hides, skins, leather and other similar pieces of work.

A machine which is widely used at the present time in splitting operations upon hides and skins is provided with a stationary knife or cutter against which the hide or skin is drawn by means of feed rolls in the operation called "cheeking" which involves the splitting off of portions from the thick parts of the heads and necks of hides or skins. This machine is difficult and even dangerous to operate and has the disadvantage of unduly stretching the portions of the work being operated upon, due to the fact that the work is pulled against the cutting edge of a stationary knife. A number of attempts have been made to improve this prior machine but, so far as applicant is aware, none of these machines has gone into general use in this country.

It is an object of this invention to provide an improved machine for splitting operations upon hides and skins, and particularly adapted for cheeking operations, which will be simple and durable in construction and especially efficient in operation without any of the disadvantages inherent in prior constructions.

To this end and in accordance with important features of the invention, the illustrated machine is provided with a cutter movable to draw its cutting edge in a direction transverse of the feeding movement of the work to effect cutting of the work without subjecting the latter to undue stretching, and arranged for co-operation with a bed-roll movable between work-receiving and work-presenting positions with respect to the cutter, the illustrated cutter being arranged in an approximately vertical plane, so that as the bed-roll moves to work-presenting position it co-operates with the cutter in determining the thickness to which the cheeked portions are to be reduced. In order to minimize wear and tear of the machine parts, the illustrated power means provided for operating the cutter while the work is in cutting position is thrown out of operation as soon as the bed-roll starts to move away from the cutter toward work-receiving position. Conveniently, the power means for operating the cutter is controlled by the means for moving the bed-roll, the arrangement being such that a cam associated with the bed-roll initiates operation of the cutter at the instant or slightly before the bed-roll reaches work-presenting position and controls disconnection of the power means early in the movement of the bed-roll toward work-receiving position.

Other features of the invention relate to the provision of improved means for spreading the work on the bed-roll prior to the cutting operation, the said means comprising, as illustrated, a plurality of presser members contacting with each other in an edge to edge relationship so that all portions of the work are simultaneously pressed upon and properly controlled along a line extending transversely of the direction of movement of the work. Conveniently, the position of each presser member may be adjusted as desired to regulate the pressure upon the work and to vary the position of each presser member relatively to the cutter. Preferably, and as shown, the presser members are so located as to have portions thereof effective to press the work against that cutting edge of the cutter which faces away from the bed-roll. In this way, there is secured perfect cutting of the work to the very edge portions of the latter. Were it not for this arrangement, the last or rear edge portions of the work might escape from control thus preventing proper cutting of the work, as evidenced by a lack of uniformity in the thickness of the cheeked portions of the work. In the illustrated machine, also, means is conveniently provided for maintaining the relationship of the presser members relatively to the knife during vertical adjustment of the latter, the advantage of this construction being that having once secured the desired relationship between the presser members and the knife through individual adjustment of the presser members this relationship is not destroyed in adjusting the knife with respect to the bed roll. In order that all of the presser members may be moved simultaneously away from the cutter to permit cleaning and honing of the cutter, they are mounted upon a member which may be adjusted manually, as by a hand lever, means being provided for locking the mounting member to hold the presser members in uncovering position with respect to the cutter, and also in operative position with respect to the cutter and bed-roll.

These and other features of the invention will now be described in detail and pointed out in the appended claims.

Figure 1:
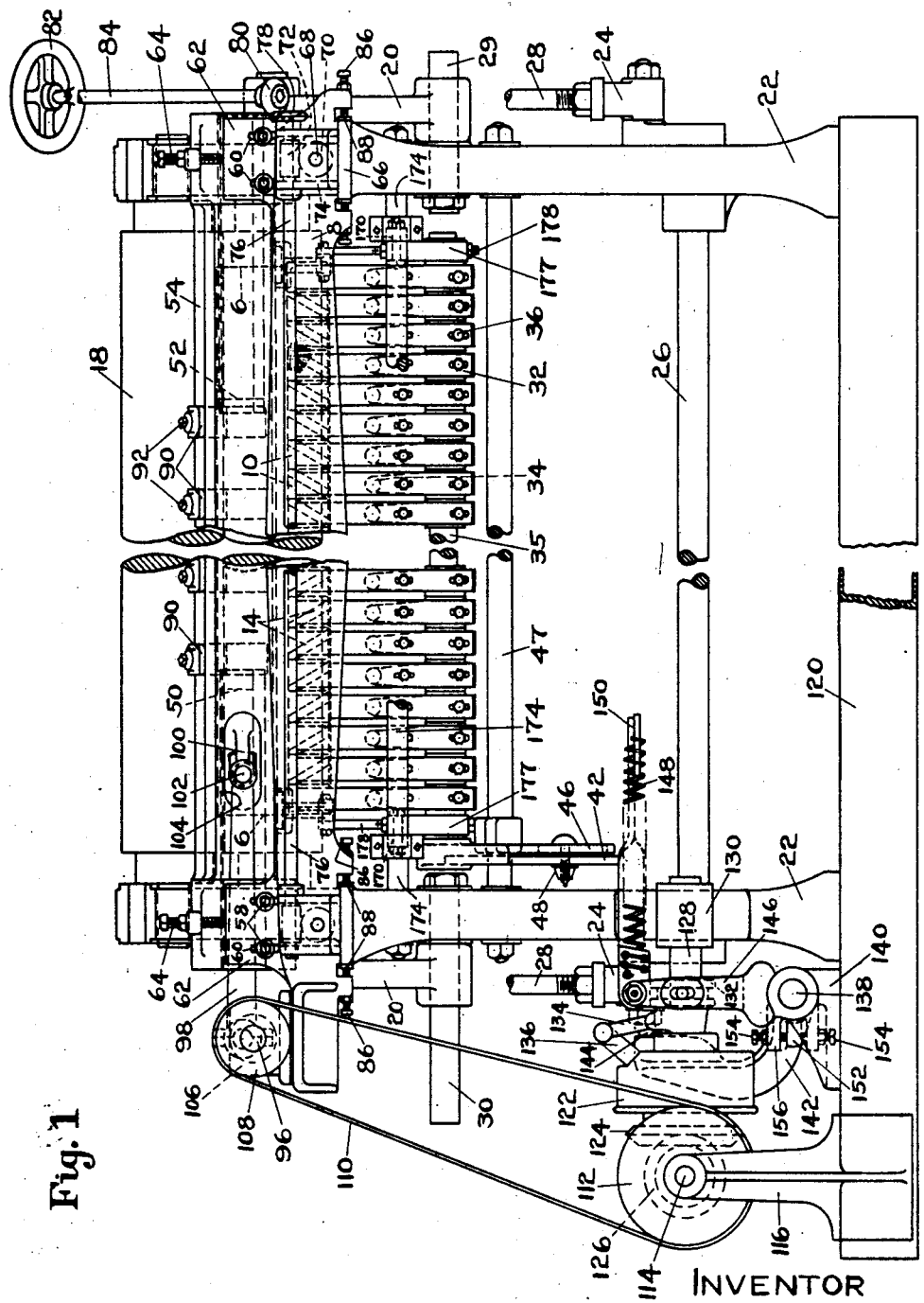
Fig. 1 is a view in rear elevation of a splitting machine illustrating one embodiment of the invention.

In the illustrated machine, which is designed for the splitting off of the thick portions of hides and skins, there is shown a knife 6 (Fig. 4) disposed in an approximately vertical plane and adapted to co-operate with a rubber covered bed roll 8 for supporting hides, skins or other work and with which there are associated a series of spring pressed members 10, each wedge-shaped in cross-section, by means of which a piece of work 12 is pressed or smoothed down upon the bed roll prior to the action of the knife thereon. Each member 10 has a concave face with a rib 14 thereon having a curved surface which may correspond approximately to the periphery of the roll 8 but said members are so arranged that their faces are not absolutely concentric with the roll 8, the tips 16 of the members being nearest thereto, so that they exert their maximum pressure at this point. That is to say, as the work is drawn between the roll 8 and the members 10 it is subjected to a gradually increasing pressure. The members 10 are also so adjusted that the tips 16 thereof overlap the cutting edge of the knife to some extent during the cutting action. The purpose of the arrangement by which the presser members 10 overlap that surface of the cutting edge of the knife 6 which faces away from the roll 8 is to secure cutting of the material in such a way that it is under control while its extreme rear edge portions are being operated on by the knife. Upon inspection of Fig. 4 of the drawings it will be observed that the parts of the members 10 which overlap the cutting edge of the knife serve to control the portions being split off from the piece of work.

It will be readily understood also that the pressing members 10 by reason of their relationship to the bed roll 8 and the cutter 6 maintain control of the piece of work being cut until the knife has passed through to the extreme edge of the work, thus insuring that the split portion will be severed entirely from the skin and that it will be uniform in thickness with the rest of the body portion of the skin. Due to the provision of the ribs 14 on the concave surfaces of the members 10 there is a spreading action exerted upon the hide or skin as the latter is drawn into contact with the surface of the bed roll 8 during rotation of the bed roll and a roll 18 which cooperates with the bed roll in feeding the work. Since the tip portion 16 of each presser member 10 is nearer to the surface of the bed roll 8 than other portions of the member 10, it follows that the greatest pressure exerted by the members 10 is at the upper edge thereof and that in this way the work is subjected to gradually increasing pressure as it is fed in between the presser members and the bed roll, the effect being to increase the efficiency of the presser members 10 as a smoothing and spreading means. The knife or cutter 6 is operated to draw its cutting edge through the work while the latter is being moved along with the surface of the bed roll 8. Because of this drawing movement of the cutter the tendency to stretch the work unduly as in certain prior constructions is reduced to a minimum. Furthermore, the fact that the piece of work is backed by a moving surface opposite the edge of the cutter is an important factor in securing good cutting with a minimum stretching of the work. Obviously, if the backing surface opposite the cutting edge of the knife were provided by a stationary member over which the work would have to be dragged, there would be considerably more of a tendency to stretch the work to an undesirable extent, whereas the bed roll 8 provides a backing surface which moves with the work, thereby removing all friction and facilitating the proper presentation of the work to the cutter in a manner to secure good cutting without stretching of the work. The knife or cutter 6 has already been described as being disposed in an approximately vertical plane. As a matter of preference and as shown in the drawings, the knife or cutter 6 is at an angle to the vertical plane passing through the edge of the knife, the purpose being to permit the feed roll 18 to be positioned closer to the edge of the knife than would otherwise be possible so that the distance between the edge of the knife and the line of grip between the two feed rolls 8 and 18 is reduced to the minimum distance. This is another factor contributing to good feeding of the work and the minimizing of a tendency to stretch the work unduly.

The bed roll 8 is carried by swing arms 20 (Figs. 1 and 2) mounted in the frame of the machine which includes side members 22, and actuated by crank arms 24 on a shaft 26 through the medium of connecting rods 28 and toggles 28ª. Conveniently the swing arms 20 are freely mounted for oscillation on stub shafts 29, 30 which are carried by the frame side member 22. The shaft 26 is driven by mechanism controlled by a treadle (not shown) and so arranged that upon each depression of the latter the shaft rotates through half a revolution and then stops with the bed roll 8 either in working position or in work receiving position (indicated by dot-and-dash lines in Fig. 2) in a manner well known in connection with other machines for treating hides, skins and the like (see, for instance, United States Letters Patent No. 1,332,747 granted March 2, 1920, upon application of J. W. O'Donnell).

The feed roll 18 is mounted in the machine frame by means of spring pressed bearings and may be driven in any known manner. The bed roll 8 may be driven from the feed roll 18 through the medium of mangle gears (not shown).

Figure 2:
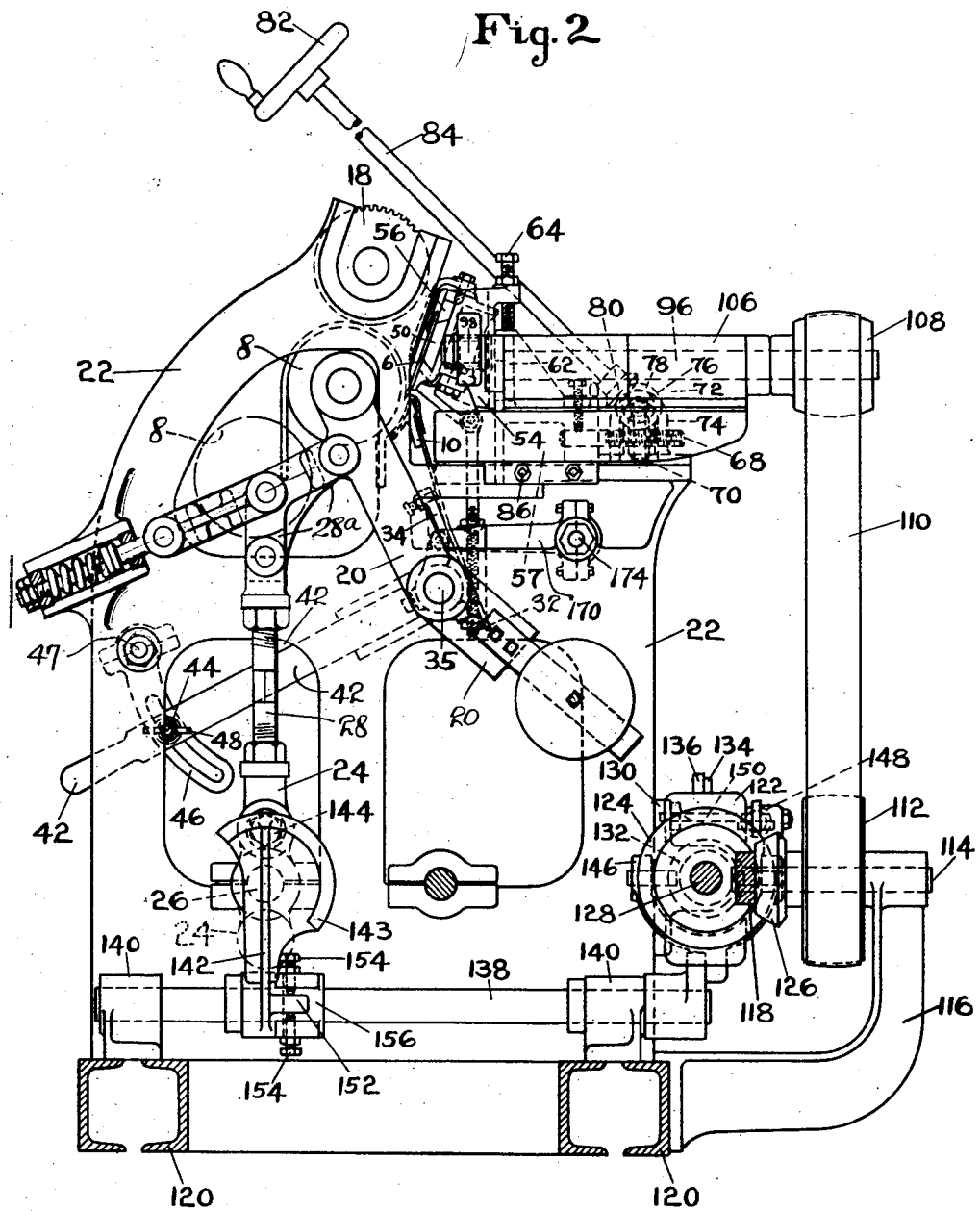
Fig. 2 is an end elevation partly in section of the machine shown in Fig. 1.
Figure 4:
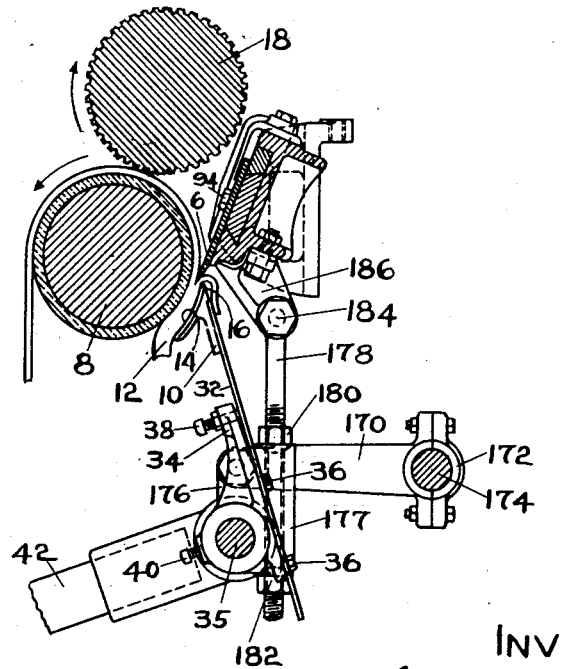
Fig. 4 is a sectional view of the knife or cutter and of the bed and feed rolls shown in co-operation with presser members for holding the work in proper position during cutting operations.

Referring to Figs. 1, 2 and 4, the presser members 10 are attached to flat springs 32 which are secured to arms 34 mounted independently of each other on the rock shaft 35. The construction and arrangement are such that the presser members 10 make contact with each other in edge-to-edge or side-by-side relationship, as shown in Fig. 1, for the purpose of securing pressure on all portions of the work on a line extending transversely thereof, as previously mentioned herein. The springs 32 are formed with slots for the passage of fixing-screws 36 so that the members 10 may be adjusted vertically, i. e., relatively to the cutting edge of the knife. Each arm 34 is provided with a screw 38 which serves to flex its associated spring 32 in order to vary the pressure exerted thereby and with a screw 40 for fixing it on the rock shaft. Thus by means of the screws 38 some springs may be flexed more than others while the various presser members 10 may be appropriately positioned on the rock shaft 35 by means of the screws 40 in order to exert the desired pressure on the work. The rock shaft 35 has a hand lever 42 fast on one end thereof so that it may be adjusted in order to move the presser members bodily to provide access to the knife 6 for the purpose of cleaning or honing it as has been previously set forth herein. The lever 42 is fitted with a pin 44 which works in an adjacent slotted member 46, carried by tie rod 47 in the machine frame, and is engaged by a clamping nut 48 whereby the lever and consequently the presser members 10 may be fixed in any desired position.

The knife 6 is attached to slides 50, 52 adapted to reciprocate in corresponding guideways at the opposite ends of a frame 54. One side of each guideway is formed by an adjustable strip 56 (Fig. 2) in order to compensate for wear in the usual manner. The frame 54 is mounted on a beam 57 by means of screws 58 which pass through slots 60 in vertical extensions 62 at opposite ends of the beam 57 so as to permit adjustment of the frame 54 and consequently of the knife 6 vertically in order to obtain the most suitable cutting position. This adjustment is effected by means of screws 64 threaded through bosses on the frame which project over the aforesaid vertical extensions 62 so as to enable the screws to impinge thereon. The beam 57 is mounted so as to be adjustable horizontally upon the side members 22 of the machine frame in order that the knife 6 may be likewise adjusted relatively to the bed roller as determined by the thickness to which the work is to be reduced. Conveniently the beam 57 is constructed to fit over slides 66 formed on the side members 22 and has screw threaded spindles 68 fixed therein at opposite ends thereof on which worm wheels 70 driven by worms 72 are mounted. The worm wheels are located in bearings 74 fixed on the adjacent frame members. The worms 72 are mounted on a common cross shaft 76 rotatable in the bearings 74 and rotated, when required, by means of mitre gears 78 and 80 actuated by a hand wheel 82 through the medium of a shaft 84. The worm wheels thus act as nuts so that when they are rotated horizontal movement is imparted to the beam 57. Endwise vibration of the beam 57 is prevented by screws 86 which preferably impinge on fitting strips 88. The knife 6 is prevented from bowing by cramp plates 90 attached at suitable distances apart to the frame 54 and slotted for the passage of the fixing screws 92 so as to permit of slight adjustment thereof for contact with the knife without binding thereon. The knife is also slotted for the passage of the screws 94 (Fig. 4) whereby it is fixed to the slides so as to permit of its adjustment on the frame 54. Instead of being angularly disposed the knife may be vertically arranged.

Figure 3:
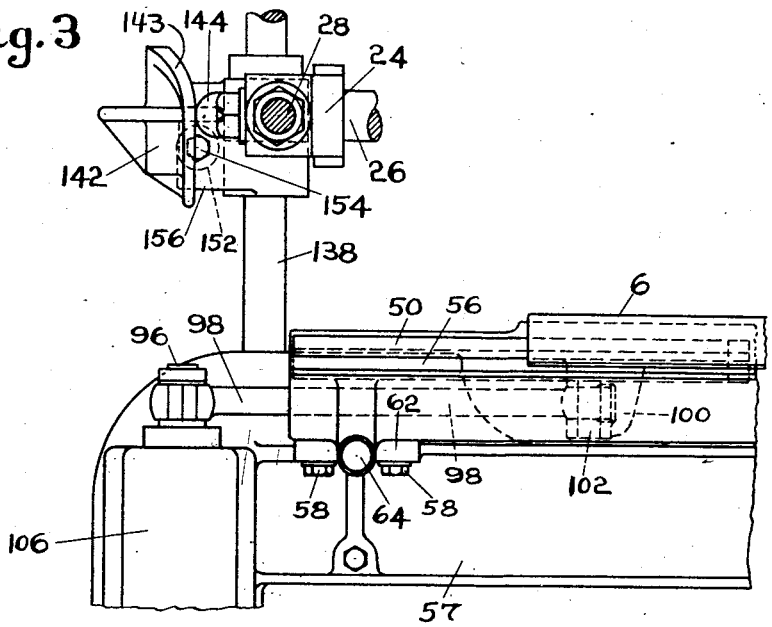
Fig. 3 is a plan view of part of the knife or cutter actuating and controlling means.

Referring to Figs. 1 to 3, the knife is reciprocated by a crank-shaft 96 to which the slide 50 is connected by means of a connecting rod 98, the slide being formed with a jaw 100 for the reception of the small end of the connecting rod 98 and a gudgeon pin 102. The knife frame is provided with a slot 104 through which the jaw 100 projects from the rear of the slide. The crank shaft 96 is carried by bearings 106 fixed on the adjustable beam 57 and may be fitted with a pulley 108 driven by a belt 110 from a pulley 112 fast on a countershaft 114 mounted in bearings 116 and 118. The bearing 116 is attached to one of four channel members 120 which serve to support the machine. This counter shaft 114 is driven through the medium of a clutch 122 and bevel gears 124 and 126 from a driving shaft 128 supported at one end by a bearing 130 and near the other end by a similar bearing (not shown). This shaft 128 may be equipped with fast and loose pulleys (not shown) or driven in any other convenient manner. The clutch 122 may be of any suitable form, but is conveniently of the contracting coil or band type and is rendered operative and inoperative by a sliding collar 132 which acts through a link 134 and a lever 136. The operation of the clutch takes place in conjunction with the operation of the crank shaft 26, and is effected through intermediate mechanism comprising a rock shaft 138 mounted in bearings 140 fitted with a lever 142, the free end of which is shaped as shown at 143 in Figs. 2 and 3 for engagement by a nose piece 144 fixed in the end of the adjacent crank arm 24, and a clutch fork 146 for actuating the collar 132. A spring 148 is attached to the clutch fork 146 and to an arm 150 attached to the bearing 130. When the bed roll 8 occupies its inoperative position, the crank arm 24 extends downward as represented by dot-and-dash lines in Fig. 2, so that the nose piece is clear of the lever, and the clutch is held inoperative by the spring 148. When, as before explained, the crank shaft 26 is rotated through half a revolution in a clockwise direction (Fig. 2) to move the bed roll 8 to its operative position, the nose piece 144 acts upon and shifts the lever 142 thereby throwing the clutch into action and starting the knife. The contact between the nose piece and the lever is, of course, maintained when the rotation of the crank shaft 26 is arrested. Upon a further half revolution of the crank shaft in the same direction, i. e., to move the bed roll 8 to inoperative or work-receiving position, the lever 142 is released so that the spring 148 operates to throw out the clutch and stop the knife. The arcuate part of the lever 142 is so shaped that the knife attains its top speed as the bed roll 8 reaches operative position, while the clutch is released practically as soon as the reverse movement of the bed roll is commenced. To this end also the said lever 142 is adjustably arranged. Conveniently it is formed with a lug 152 and freely mounted on the rock shaft 138 so that said lug extends between two screws 154 fitted in an adjacent bifurcated member 156 fast on the rock shaft. The lever 142 may thus be adjusted relatively to the nose piece 144 while its movement is transmitted to the rock shaft through the screws and the bifurcated member. Obviously by constructing, arranging and operating the knife and driving means therefor in the manner aforesaid wear and tear in the machine is reduced to a minimum.

The feed roller 18 and crank shaft 26 may be driven from the shaft 128 through the medium of gearing and counter shaft mechanism (not shown) with which the aforesaid treadle actuated clutch hereinbefore referred to is associated.

Preferably, and as shown, the shaft 35, which supports the presser members 10, is not mounted directly in the frame of the machine but is carried at the ends of arms 170 each rotatably mounted upon a tie rod 174 secured to and extending between the upright side pieces 22 of the machine frame. At their ends the arms 170 are secured to ears 176 extending upwardly from castings or journal bearings 177 in which the shaft 35 is rotatably mounted. Each journal bearing or casting 177 is bored to receive a rod 178 having screw threaded portions adapted to receive nuts 180, 182 for securing rod 178 in adjusted relation to the journal bearing. At its upper end the rod 178 is pivotally connected at 184 to a projection 186 from the knife carrying frame 54. Hence, when the frame 54 is adjusted vertically through proper manipulation of the screws 64 the shaft 35 is also adjusted vertically. Hence, in every adjustment of the knife 6 in a vertical direction there is a corresponding adjustment of the presser members 10 whereby these latter retain their adjusted relationship with respect to the knife 6. In other words, having adjusted the presser members 10 to bring them into proper relationship to the knife 6 this relationship may be maintained while the knife 6 is being adjusted with respect to the bed roll 8 through manipulation of the screws 64. As heretofore stated, the presser members 10 may be secured in adjusted relation to their supporting arms 34 by proper manipulation of the fixing screws 36. Furthermore, the shaft 35 and all the presser members 10 carried thereby may be adjusted in a vertical direction by proper manipulation of the nuts 180, 182. The importance of the arrangement just described resides in the fact that the knife 6 may be adjusted vertically without disturbing the relationship of the presser members 10 with respect to the knife.

In operating with this machine a hide or skin to be cheeked or other piece of work to be split is placed over the bed roll 8 when the latter is in open position as indicated by the dash-and-dot lines in Fig. 2 of the drawings. Upon stepping on the treadle, the bed roll moves to the position shown in solid lines in the said figure in which the piece of work is pressed against the feeding roll 18 and is presented to the reciprocatory cutter 6. As heretofore stated the cutter is controlled by the movement of the bed roll 8, the arrangement being such that as the bed roll reaches work presenting position the cutter is operating so that its cutting edge is drawn through the work at the instant feeding of the work begins through the co-operation of the bed roll 8 and the feed roll 18. When the bed roll 8 reaches work presenting position with respect to the cutter 6 the spreading and pressing members 10 become operative at the same time to press the work against the bed roll 8 and against that surface of the cutter 6 which faces away from the bed roll 8. The presser members 10 not only control the work in the sense of keeping it in contact with the bed roll 8 and with the cutter 6, but also spread the work lengthwise of the bed roll 8, this being due to the action of the ribs 14 which are obliquely arranged to exert a spreading action in opposite directions from the middle portion of the roll 8, as will be clear upon inspection of Fig. 1 of the drawings. It is to be understood that, in cheeking operations, only the head and neck portions of the hide or skin are thrown over the bed roll 8 when it is in work receiving position and that the cutter operates to remove the excess thickness of these portions while the hide or skin is being fed out of the machine in a direction toward the operator. As soon as the piece of work is entirely fed out of the machine the operator presses the treadle, whereupon the bed roll 8 is returned to work receiving position, the cutter 6 coming to rest shortly after the bed roll starts upon its movement to work receiving position.

Having thus described my invention, what I claim as new and desire to secure by Letters Patent of the United States is:—

1. In a splitting machine, a cutter movable to draw its cutting edge in a direction transverse of the feeding movement of the work, a bed-roll movable between work-receiving and work-presenting positions with respect to the cutter, power means for operating the machine, and means automatically operative for alternately initiating and discontinuing the operative movements of the cutter while the power means remains connected to operate the machine.

2. In a splitting machine, a cutter movable to draw its cutting edge in a direction transverse of the feeding movement of a piece of work, a bed-roll movable between work-receiving and work-presenting positions with respect to the cutter, and means operating in timed relation to the bed roll for alternately initiating and discontinuing the operative movements of the cutter.

3. In a splitting machine, a cutter movable to draw its cutting edge in a direction transverse of the feeding movement of the work, a bed roll movable between work-receiving and work-presenting positions with respect to the cutter, power means for operating the cutter, and means operating in timed relation to the bed roll for effecting connection of the cutter with respect to its power means immediately before presentation of the work to the cutter and disconnection from its power means just as the bed roll starts its movement toward work-receiving position.

4. In a splitting machine, a cutter movable to draw its cutting edge in a direction transverse of the feeding movement of a piece of work, a bed roll movable between work-receiving and work-presenting positions with respect to the cutter, power means for operating the cutter, and means controlling the bed roll for effecting also connection and disconnection of the cutter with respect to its power means.

5. In a splitting machine, a cutter movable to draw its cutting edge in a direction transverse of the feeding movement of the work, a bed roll movable between work-receiving and work-presenting positions with respect to the cutter, power means for operating the cutter comprising a clutch, and means for throwing in the clutch as the bed roll moves to work-presenting position and for causing disconnection of the clutch as the bed roll moves away from the cutter.

6. In a splitting machine, a cutter movable to draw its cutting edge in a direction transverse of the feeding movement of a piece of work, a bed roll movable between work-receiving and work-presenting positions with respect to the cutter, power means for operating the cutter comprising a clutch, and means controlling the bed roll for also throwing in the clutch, as the bed roll moves to work-presenting position and for causing disconnection of the clutch as the bed roll moves away from the cutter.

7. In a splitting machine, a cutter movable to draw its cutting edge in a direction transverse of the feeding movement of the work, a bed roll movable between work-receiving and work-presenting positions with respect to the cutter, power means for operating the cutter, a movable support for the bed-roll, and a cam for causing power operation of the cutter and for controlling the power means to discontinue operation of the cutter as the bed-roll starts on its movement toward work-receiving position.

8. In a splitting machine, a cutter movable to draw its cutting edge in a direction transverse of the feeding movement of a piece of work, a bed roll movable between work-receiving and work-presenting positions with respect to the cutter, power means for operating the cutter comprising a clutch, a movable support for the bed roll, and a cam for operating the clutch to initiate power operation of the cutter and to control the clutch to effect disconnection of the cutter from its power means as the bed roll starts on its movement toward work-receiving position.

9. In a splitting machine, a cutter for operating on pieces of work, a bed roll movable between work-receiving and work-presenting positions with respect to the cutter, and means for pressing the work against the cutter to control the work during cutting operations on the work to the extreme edges thereof.

10. In a splitting machine, a cutter for operating upon a piece of work, a bed roll movable between work-receiving and work-presenting positions with respect to the cutter, and a plurality of presser members for pressing the work against the bed roll and also against that surface of the cutter facing away from the bed roll.

11. In a splitting machine, a cutter for operating upon a piece of work, a bed roll movable between work-receiving and work-presenting positions with respect to the cutter, and a plurality of presser members having each a concave surface for pressing the work against the bed roll and having each a projecting portion for pressing the work against that surface of the cutter which faces away from the bed roll.

12. In a splitting machine, a cutter for operating upon a piece of work, a support for backing the work during operations of the cutter, means co-operating with the support for feeding the work past the cutter, and yielding presser means for pressing the work against the backing support and also against the edge portion of the cutter facing away from the backing support.

13. In a splitting machine, a cutter for operating upon a piece of work, a support for backing the work during operation of the cutter, means co-operating with the support for feeding the work past the cutter, and yielding presser means for pressing the work against that surface of the cutter which faces away from the backing support.

14. In a splitting machine, a cutter for operating upon a piece of work, a roller support for backing the work during operation of the cutter, a member co-operating with the roller support to feed the work past the cutter, and a plurality of independently yielding presser members for pressing the work against that surface of the cutter which faces away from the roller support.

15. In a splitting machine, a cutter for operating upon a piece of work, a roller support for backing the work during operation of the cutter, a feed roll co-operating with the roller support to feed the work past the cutter, and a plurality of presser members for co-operation with the backing support in spreading the work thereon prior to the operation of the cutter, said presser members being also operative to press a split portion of the work against that surface of the cutter which faces away from the roller support.

16. In a splitting machine, a cutter for operating upon a piece of work, a bed roll movable between work-receiving and work-presenting positions with respect to the cutter, and a plurality of presser members for pressing the work against the bed roll and against the cutter, said members being mounted independently for adjustment with respect to the bed-roll to vary the pressure thereon and also adjustable with respect to the cutter to vary the overlapping of the presser members with respect to that surface of the cutter which faces away from the bed roll.

17. In a splitting machine, a cutter for operating upon a piece of work, a bed-roll bodily movable between work-receiving and work-presenting positions with respect to the cutter, a plurality of presser members located adjacent to the cutter for co-operation with the bed-roll in spreading the work thereon in directions longitudinal of the bed roll prior to the operation of the cutter, and a support for the presser members movable to withdraw the presser members simultaneously from the bed roll and cutter to permit access thereto.

18. In a splitting machine, a cutter for operating on pieces of work, a support for holding the cutter in an approximately vertical plane, and a bed-roll bodily movable in each cycle of the machine away from the cutter to work-receiving position and toward the cutter to work-presenting position with respect to the cutter, said bed roll serving as a backing for the work during cutting operations.

19. In a splitting machine, a cutter for operating on a piece of work, and a bed roll bodily movable between work-receiving and work-presenting positions, the bed roll serving as a backing for the work during cutting operations, and the cutter being adjustable toward and from the bed roll to regulate the thickness of a split portion of the work.

20. In a splitting machine, a cutter for operating on pieces of work, a bed roll bodily movable between work-receiving and work-presenting positions with respect to the cutter, and a support for the cutter, the support and the cutter being adjustable with respect to the bed-roll to regulate the thickness of a split portion of the work.

21. In a splitting machine, a cutter for operating on pieces of work, a bed roll movable between work receiving and work presenting positions with respect to the cutter, said bed roll serving as a backing for the work during cutting operations, a support for the cutter arranged to hold it at an angle to a vertical plane passing through the cutting edge of the cutter, and a feed roll located closely adjacent to the cutter for co-operation with the bed roll in feeding the work past the cutter.

22. In a machine for operating upon hides, skins, leather and other similar pieces of work, a cutter, a support for presenting the work to the cutter, means for pressing the work against a face of the cutter, the cutter being adjustable with respect to the work support, and connections between the cutter and the pressing means whereby the established relationship between the pressing means and the cutter is maintained during adjustment of the latter.

23. In a machine for operating upon hides, skins, leather and other similar pieces of work, a cutter, a support for presenting the work to the cutter, and means for pressing the work against a face of the cutter, the cutter and the pressing means being simultaneously adjustable with respect to the work support.

24. In a machine for operating upon hides, skins, leather and other similar pieces of work, a cutter, a bed roll for supporting the work during the operation of the cutter, and presser members for pressing the work against that surface of the cutter which faces away from the bed roll, the cutter and the presser members being simultaneously adjustable so that the relationship between the presser members and cutter is maintained while adjusting the cutter relatively to the bed roll.

25. In a machine for operating upon hides, skins, leather and other similar pieces of work, a cutter, a support for presenting the work to the cutter, a plurality of members arranged in slightly overlapping relation to the cutter for pressing the work against a face of the cutter for controlling the work during cutting operations, said members being adjustable to vary the overlapping of the members with respect to said face of the cutter, the cutter being adjustable with respect to the work support, and connections between the cutter and the pressing members constructed and arranged to maintain the established relationship of the pressing members with respect to the cutter during and after adjustment of the latter.

26. In a machine for cheeking hides and skins, a cutter, a bed roll for supporting a hide or skin to be cheeked, and a plurality of members arranged to press the hide or skin against the bed roll during a cutting operation, said members serving also to press a split portion of the hide or skin against a surface of the cutter which faces away from the bed roll, the cutter and the pressing members being simultaneously adjustable to vary the postion of the cutter with respect to the bed roll while maintaining the established relation between the pressing members and the cutter.

27. In a machine for operating upon hides, skins, leather, and other similar pieces of work, a bed roll for supporting a piece of work, a cutter for operating on the work supported by the bed roll, a plurality of presser members for pressing the work against the bed roll and against the surface of the cutter which faces away from the bed roll, a member for supporting the presser members, a support for the cutter, links pivotally connected to the cutter support for supporting said member so that upon adjustment of the cutter support the presser members are caused to maintain their adjusted relation with respect to the cutter, and links pivotally connected to said member and to fixed portions of the frame of the machine to maintain the pressure of the presser members against the piece of work being operated on by the cutter.

28. In a splitting machine for operating on hides, skins, leather and other similar pieces of work, a bed roll, a cutter for operating on a piece of work while it is supported by the bed roll, and a plurality of members disposed in side-by-side abutting relationship to press upon a piece of work to hold it against the bed roll and against the cutter.

29. In a splitting machine for operating on hides, skins, leather and other similar pieces of work, a bed roll, a cutter for operating on a piece of work while it is supported by the bed roll, and a plurality of members disposed in side-by-side abutting relationship to press upon a piece of work to hold it against the bed roll and against the cutter, each pressing member being individually adjustable to vary its pressure upon the work.

30. In a splitting machine for operating on hides, skins, leather and other similar pieces of work, a bed roll, a cutter for operating on a piece of work while it is supported by the bed roll, and a plurality of members disposed in side-by-side abutting relationship to press upon a piece of work to hold it against the bed roll and against the cutter, each presser member being adjustable to vary the extent of its overlapping relationship with respect to the cutter.

31. In a splitting machine for operating on hides, skins, leather and other similar pieces of work, a bed roll, a cutter for operating on a piece of work while it is supported by the bed roll, and a plurality of members disposed to press upon a piece of work to hold it against the bed roll and against the cutter, each presser member being adjustable to vary its pressure upon the work supported by the bed roll and to vary the extent of its overlapping relationship with respect to the cutter.

32. In a machine for cheeking hides and skins, a cutter, a bed roll movable between work receiving and work presenting positions with respect to the cutter, and means for spreading the hide or skin to be cheeked on the bed roll as a preliminary to the operation of the cutter, said spreading means serving also to hold a split portion of the work against a surface of the cutter.

33. In a machine for cheeking hides and skins, a cutter, a bed roll movable between work receiving and work presenting positions with respect to the cutter, and a plurality of members operative to spread the hide or skin over the bed roll preliminarily to the operation of the cutter, said spreading members having portions arranged to overlap a surface of the cutter to control a split portion of the hide or skin during splitting operations.

34. In a machine for cheeking hides and skins, a cutter, a bed roll for supporting a hide or skin for operation by the cutter, means for pressing the hide or skin against the bed roll operative for smoothing and spreading the hide or skin prior to the action of the cutter, said means comprising a member having a concave surface corresponding to the convex surface of the bed roll but so located that its upper end is nearer to the bed roll than its lower end, whereby the hide or skin is subjected to gradually increasing pressure as it passes upwardly between the bed roll and the pressing means.

35. In a machine for cheeking hides and skins, a cutter, a bed roll for supporting a hide or skin for operation by the cutter, and a plurality of members operative to press the hide or skin against the bed roll and to spread the same upon said surface before it reaches the cutter, each of the members having a concave surface corresponding to the convex surface of the bed roll and having its upper end located closer to the surface of the bed roll than the lower end thereof whereby the hides and skins are subjected to a gradually increasing pressure as the portions thereof approach the edge of the cutter.

In testimony whereof I have signed my name to this specification.

GUSTAV ADOLF SCHETTLER.